(12) United States Patent
Eriksen et al.

(10) Patent No.: US 10,596,998 B2
(45) Date of Patent: Mar. 24, 2020

(54) SYSTEM AND METHOD FOR COMBINING A WIRELESS DEVICE, SUCH AS A KEY OR OTHER DEVICE WITH A WIRELESS KILL SWITCH

(71) Applicant: FELL Technology AS, Drammen (NO)

(72) Inventors: Fredrik Eriksen, Oslo (NO); Christian Frost Røine, Drammen (NO)

(73) Assignee: Fell Technology AS, Drammen (NO)

( * ) Notice: Subject to any disclaimer, the term of this patent is extended or adjusted under 35 U.S.C. 154(b) by 0 days.

(21) Appl. No.: 16/273,744

(22) Filed: Feb. 12, 2019

(65) Prior Publication Data

US 2019/0248329 A1    Aug. 15, 2019

Related U.S. Application Data

(60) Provisional application No. 62/629,239, filed on Feb. 12, 2018, provisional application No. 62/629,225, (Continued)

(51) Int. Cl.
*B60R 25/24* (2013.01)
*H04L 12/40* (2006.01)
(Continued)

(52) U.S. Cl.
CPC ............ *B60R 25/24* (2013.01); *B60R 25/04* (2013.01); *B60R 25/209* (2013.01); *B60R 25/23* (2013.01); *B60R 25/31* (2013.01); *G07C 9/00174* (2013.01); *G07C 9/00309* (2013.01); *G07C 9/00857* (2013.01); *H04L 12/40* (2013.01); *H04W 4/38* (2018.02); *H04W 4/44* (2018.02); *H04W 12/0802* (2019.01); *H04W* *76/15* (2018.02); *B60R 2325/101* (2013.01); *B60R 2325/108* (2013.01); *B60R 2325/205* (2013.01);
(Continued)

(58) Field of Classification Search
CPC ... B60R 25/24; H04W 76/15; G07C 9/00309; G07C 9/00857
See application file for complete search history.

(56) References Cited

U.S. PATENT DOCUMENTS 3,786,892 A    1/1974    Horton
3,889,089 A    6/1975    Tomlin
(Continued)

FOREIGN PATENT DOCUMENTS

GB        2286247       1/1995
WO        9735738       3/1997
WO    WO2017035590    3/2017

OTHER PUBLICATIONS

International Search Report and Written Opinion dated May 8, 2019 in Application No. PCT/EP2019/053456.
(Continued)

*Primary Examiner* — Vernal U Brown
(74) *Attorney, Agent, or Firm* — AWA Sweden AB; Thomas L. Ewing (57) ABSTRACT

An embodiment of the invention provides a system and or method for combining wireless kill switch functionality and key either mechanical or wireless or other form of access control components. Embodiments of the invention comprise hardware including but not limited to, processing circuitry and wireless transceiver to fulfill the function as both a key or access control device and wireless kill switch.

19 Claims, 5 Drawing Sheets

Related U.S. Application Data filed on Feb. 12, 2018, provisional application No. 62/629,234, filed on Feb. 12, 2018.

(51) Int. Cl.

| | | |
|---|---|---|
| *B60R 25/20* | (2013.01) | |
| *B60R 25/23* | (2013.01) | |
| *B60R 25/31* | (2013.01) | |
| *H04W 4/44* | (2018.01) | |
| *H04W 12/08* | (2009.01) | |
| *G07C 9/00* | (2020.01) | |
| *B60R 25/04* | (2013.01) | |
| *H04W 4/38* | (2018.01) | |
| *H04W 76/15* | (2018.01) | |
| *B63H 21/21* | (2006.01) | |
| *H04W 84/18* | (2009.01) | |

(52) U.S. Cl.
CPC .......... *B63H 2021/216* (2013.01); *G07C 2009/00388* (2013.01); *G07C 2009/00412* (2013.01); *H04L 2012/40215* (2013.01); *H04L 2012/40273* (2013.01); *H04W 84/18* (2013.01)

(56) References Cited

U.S. PATENT DOCUMENTS

| | | | |
|---|---|---|---|
| 4,250,358 A | | 2/1981 | Gilbertson |
| 4,574,752 A | * | 3/1986 | Reichert, Jr. ........... F02B 77/08 |
| | | | 123/198 DB |
| 5,019,804 A | | 3/1991 | Fraden |
| 5,229,648 A | | 7/1993 | Sues et al. |
| 5,349,329 A | | 9/1994 | Smith |
| 5,396,215 A | | 3/1995 | Hinkle |
| 5,486,814 A | | 1/1996 | Quinones |
| 5,552,773 A | | 9/1996 | Kuhnert |
| 5,642,095 A | | 6/1997 | Cook |
| 5,838,227 A | | 11/1998 | Murray |
| 5,936,412 A | | 8/1999 | Gershenfeld |
| 6,091,330 A | | 7/2000 | Swan et al. |
| 6,140,935 A | | 10/2000 | Hayton et al. |
| 6,144,112 A | | 11/2000 | Gilmore |
| 6,150,928 A | | 11/2000 | Murray |
| 6,329,913 B1 | | 12/2001 | Shieh et al. |
| 6,450,845 B1 | | 9/2002 | Snyder et al. |
| 6,476,708 B1 | | 11/2002 | Johnson |
| 6,509,747 B2 | | 1/2003 | Nagai et al. |
| 6,566,997 B1 | | 5/2003 | Bradin |
| 6,603,388 B1 | | 8/2003 | Perraud |
| 6,650,227 B1 | | 11/2003 | Bradin |
| 6,661,115 B2 | | 12/2003 | Lester |
| 6,801,134 B1 | | 10/2004 | Juzswik |
| 6,825,765 B2 | | 11/2004 | Stanley |
| 6,909,946 B1 | | 6/2005 | Kabel |
| 7,081,028 B1 | | 7/2006 | Crane |
| 7,201,619 B1 | | 4/2007 | Viggiano |
| 7,355,518 B1 | | 4/2008 | Staerzl |
| 9,047,494 B1 | | 6/2015 | Smith |
| 2006/0028353 A1 | | 2/2006 | Mueller |
| 2012/0105198 A1 | | 5/2012 | Nakashima |
| 2014/0139331 A1 | * | 5/2014 | Oliver .................... B60R 25/04 |
| | | | 340/426.19 |
| 2014/0176301 A1 | * | 6/2014 | Fernandez Banares ..................... |
| | | | G07C 9/00015 |
| | | | 340/5.26 |
| 2016/0087554 A1 | | 3/2016 | Nohra |
| 2017/0331846 A1 | | 11/2017 | Hall |

OTHER PUBLICATIONS

Key Priorities for Sub GHz Wireless Deployments, Silicon Laboratories Inc., Austin, TX, retrieved Feb. 2, 2018.

Notice of Allowance for U.S. Appl. No. 16/273,710, dated Nov. 8, 2019, including "Notice of References Cited" and comments regarding same in statement of reasons for allowance.

\* cited by examiner

SYSTEM AND METHOD FOR COMBINING A WIRELESS DEVICE, SUCH AS A KEY OR OTHER DEVICE WITH A WIRELESS KILL SWITCH

CROSS-REFERENCE TO RELATED APPLICATIONS

The present application is related to co-filed U.S. provisional patent application Ser. No. 62/629,225 entitled, "Secure Key Acknowledgement—Frequency Dilution;" U.S. provisional patent application Ser. No. 62/629,234 entitled, "System and Method for Wirelessly Linking Electronic Components and/or Sensors Using Sub-1 GHz Frequencies (700-1000 MHz) for Long Range, Robustness in Wet Environment and Highly Resistant to Wireless Noise," and U.S. provisional patent application Ser. No. 62/629,239 entitled, "A System and Method for Combining a Wireless Device, Such as a Key or Other Device with a Wireless Kill Switch." These related applications are incorporated herein by reference in their entirety.

FIELD

Embodiments of the invention relate to systems and methods pertaining to electronic key-based security systems. More particularly, an embodiment of the invention relates to systems and methods that employ electronics to combine a key or similar system with a wireless kill switch for an easy-to-use safety function.

BACKGROUND

The following description includes information that may be useful in understanding embodiments of the invention. It is not an admission that any of the information provided herein is prior art or relevant to the presently claimed invention, or that any publication specifically or implicitly referenced is prior art.

In conventional marine recreational vessels, there is typically installed a kill switch of some sort, whose intended function is to enhance safety by stopping the vessel's engine, reducing speed or engaging a switch to disable features which are not safe to have active/on when the driver is not present at the controls, e.g., when the driver has been ejected from the vessel.

In conventional marine systems the kill switch typically consists of a physical lanyard or cord that the user must attach to his body or clothes or accessories already on his body.

In automotive systems, automobiles, machinery, or any other motorized vehicle (hereinafter referred to as the "vehicle") a kill switch is not as common as it is in marine applications, although kill switches in these applications also have great utility. If the user/driver is somehow removed from the vehicle, either voluntarily or involuntarily, the vehicle equipped with a kill switch will be disabled in some way to limit unsafe behavior such as, but not limited to, continued operation without a driver or machinery operating in an unsupervised manner.

Therefore, a need exists for an improved kill switch solution that can perform an expanded set of tasks at an improved rate of performance compared to other devices found in the prior art.

SUMMARY OF THE INVENTION

Embodiments of the invention provide a system and method for combining wireless kill switch functionality and an access control or key mechanism (e.g., mechanical, electro-mechanical, wireless) to provide improved safety and convenience. Embodiments of the invention comprise hardware including but not limited to, processing circuitry and a wireless transceiver that may fulfill the functions of both a key (or access control device) and wireless kill switch. Embodiments of the invention further provide a system and method for pairing wireless key/kill switch devices with remote receiving units using a device such as a mobile phone. Embodiments of the invention further provide a system and method for allowing a receiving unit to promote a second key/kill switch device to a pilot role when a kill switch mechanism has been activated for a first key/kill switch.

BRIEF DESCRIPTION OF THE DRAWINGS

Figures provided herein may or may not be provided to scale. The relative dimensions or proportions may vary. Embodiments of the invention may be sized to fit a variety of components and systems.

DETAILED DESCRIPTION OF AN EMBODIMENT OF THE INVENTION

Embodiments of the invention provide a system and method for combining wireless kill switch functionality and an access control or key mechanism (e.g., electronic, mechanical, electro-mechanical, wireless) to provide improved safety and convenience. Embodiments of the invention comprise hardware including but not limited to, processing circuitry and a wireless transceiver that may fulfill the functions of both a key (or access control device) and wireless kill switch.

Embodiments of the invention execute a variety of advanced key and kill switch mechanisms, including embodiments related to combining keying systems with kill switch systems. Such embodiments may include components such as buttons, motion sensors for sensing specific motions that require system action, proximity sensing by acting within certain distances by measuring relative strength of wireless signal between said system and receiver.

Embodiments of the invention may eliminate the need for users (e.g., vessel captains) to remember to attach a kill switch activating lanyard while also removing the inconvenience caused by being tethered to another device.

Embodiments of the invention further enable a wireless kill switch that has been integrated into a device to act as the vessel's key or access system. In such embodiments, the user then carries with him/her an integrated device which can execute the kill switch functionality as well as providing a key or access control device.

The term "kill switch" as used herein represents a collective term for multiple types of switch/circuit-breakers designed to disable or alter a state of a component (e.g., an electro-mechanical function, a transistor, an electrical signal or the like) when activated. Kill switch technology has generally been known in the art for many years, and an ordinary artisan should find ample information regarding the construction of a conventional kill switch device.

Figure 1A:
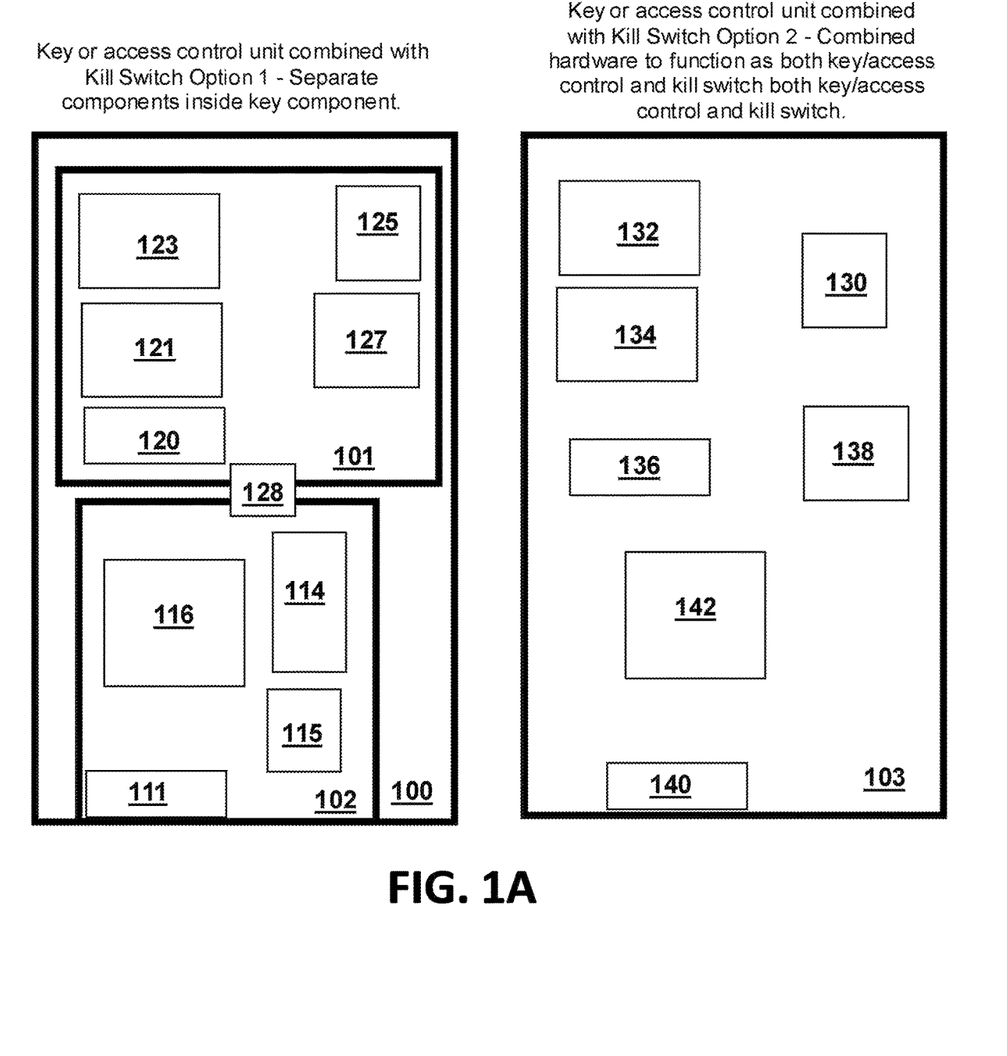
FIG. 1A illustrates two embodiments of key/kill switch control units 100, 103 suitable for use and operation with at least one embodiment of the invention.

FIG. 1A illustrates two embodiments of key/kill switch system comprising control units 100, 103 suitable for use and operation with at least one embodiment of the invention. Note: transceivers associated with embodiments of the invention may be internal to the key/kill switch system although they may be depict here for the convenience of the reader as external devices.

The key control unit 100 comprises a kill switch 102 as a separate unit from a paired access control unit 101, according to an embodiment of the invention. The kill switch 102 comprises electronic circuitry 116 or other hardware in combination with a wireless transceiver 115 configured to engage a kill switch mechanism on a device, e.g., a vehicle, such as a boat and/or the boat's engine. The access control unit 101 comprises electronic circuitry 123 that operates a keying function (e.g., a key) and/or other access control functions, e.g. with a vehicle, such as the vehicle in communication with the kill switch (e.g., unlocking a locked component on the vehicle such as a starter switch on the vehicle).

Thus, the key control unit 100 comprises two distinctive parts, the access control unit 101 and the kill switch 102, according to an embodiment of the invention. The application of two separate components may simplify assembly of the key control unit 100, especially where one of these components is supplied by a third party. In addition, having two separate units also has the advantages of modularity, allowing one component to change, modified, or replaced without requiring modification or replacement of the other component. The connector 128, as will be discussed, operates on common characteristics between access control unit 101 and the kill switch 102 and/or converts electronic characteristics between the two units.

The access control unit 101 includes an RF transceiver 125 that transmits data to and receives data from a receiving unit via the receiving unit's RF transceiver. Communications between the transceiver 125 and the receiving unit's transceiver are typically encrypted, according to an embodiment of the invention. The encrypted transmissions may employ AES128 encryption or even higher standards of encryption, according an embodiment of the invention.

The access control unit 101 includes key processing electronics 123 configured to formulate a key for processing by the receiving unit (e.g., the vehicle) and transceiver electronics 121 capable of controlling the RF transceiver 125 to transmit the key and related data to the receiving unit's RF transceiver. The transceiver electronics 121 includes the circuitry necessary for encrypting messages to be sent via the transceiver 125, according to an embodiment of the invention. The encrypted message may comprise the key (e.g., keying data).

The access control unit 101 includes a key actuator 120, according to an embodiment of the invention. The key actuator 120 may comprise a button element whose physical actuation engages the key processing electronics 123. The key actuator 120 may also comprise a proximity sensor, a visual sensor, and/or a variety of automated engagement mechanisms, according to various embodiments of the invention. An embodiment of the invention may include a proximity sensor that operates in conjunction with the transceiver 125.

The access control unit 101 also includes a battery 127 suitable for providing electrical power to the key processing electronic circuitry 123, the transceiver processing electronic circuitry 121, and the transceiver 125.

The kill switch electronics 116 may send a kill message (e.g., kill data) via a transceiver 115 to cause alter some aspect of another device (e.g., a signal to shut off the engine on a boat). Alteration of some aspect of another device may mean, for example, an action, such as shutting off and/or throttling back (e.g., slowing down) the engine on a vehicle, such as a boat. The kill switch 102 may be powered by a battery 114. In some embodiments, the disruption of regular transmissions from the transceiver 115 may effectively operate as an actuator that engages a kill switch mechanism on a paired receiving unit. In yet other embodiments, a delayed communication due to increased distance between the kill switch 102 and a receiving unit will cause the paired receiving unit to engage a kill switch mechanism.

Figure 2:
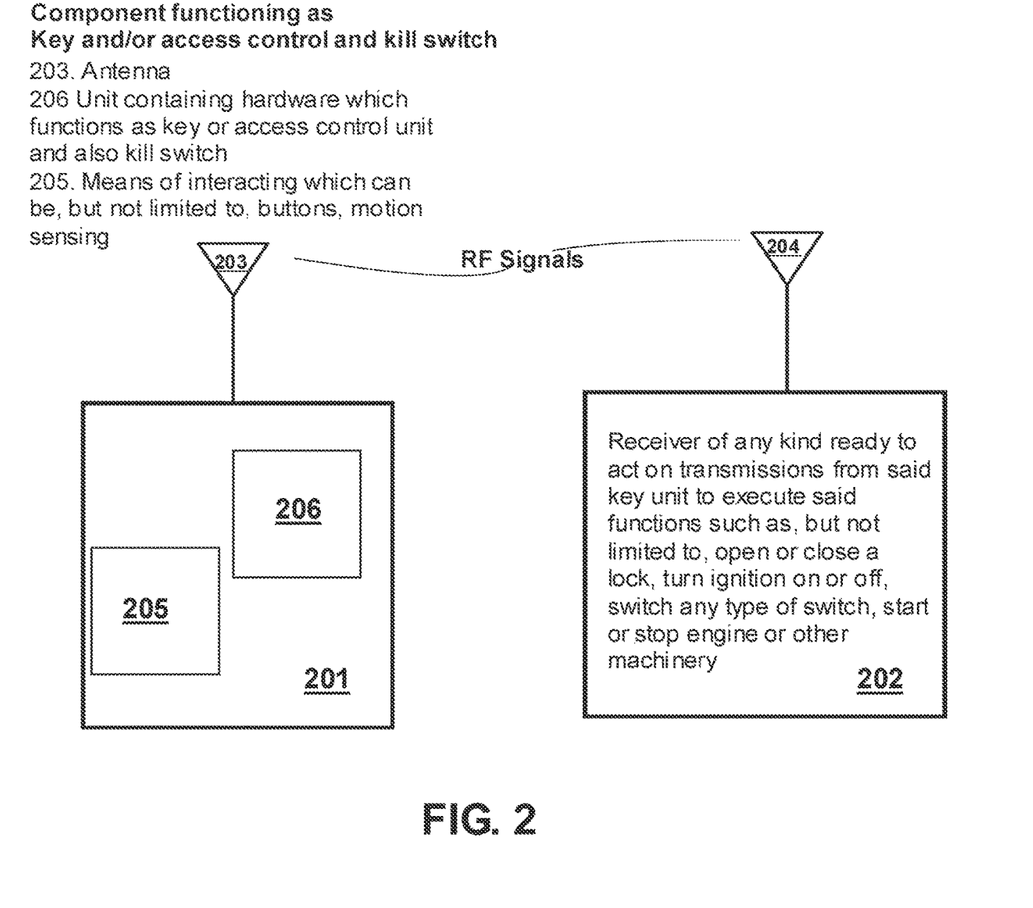
FIG. 2 illustrates an embodiment of the invention in which a key unit 201 communicates with a receiving device 202.

In some embodiments of the invention, the transceiver 115 communicates continuously with a paired transceiver on another device, e.g., a receiver associated with the motor on a boat, such as the receiver 202 shown in FIG. 2. If the transceiver 115 stops communicating with the paired transceiver, then the loss of signal will engage the stopping of the associated device. For example, if the device 100 is associated with the pilot of a boat, and the pilot falls overboard, then the transceiver 115 is likely to be submerged in water and unlikely to communicate further with the paired transceiver on the receiving device. In such a situation, the signal loss will cause the receiving unit to engage a kill switch mechanism.

In some embodiments of the invention, the transceiver 115 may be paired with a receiving unit, such as the receiver 202 shown in FIG. 2. The paired receiving unit may continuously determine its distance from the transceiver 115. The distance may be determined by the speed of a radio transmission through a medium such as air, which approaches the speed of light at approximately 3.3 nanoseconds/meter. Thus, the paired transceivers may be set for some acceptable distance (e.g., 2 meters), and if the time of the signal from the transceivers passes this range, then a kill switch mechanism on the paired receiving unit engages the kill switch signal to shut off some device, e.g., a marine boat engine.

The kill switch 102 may include an actuator 111 for engaging the kill switch electronics 116, according to an embodiment of the invention. The actuator 111 may comprise a physical connection to a device such as a lanyard that when broken or disconnected causes the actuator 111 to send a signal to the kill switch electronics 116. The transceiver 115 may receive the instruction to stop transmitting from the kill switch electronics 116 due to a signal received from the actuator 111, according to an embodiment of the invention. This stop in transmission, as described above, may cause the engagement of the kill switch, according to an embodiment of the invention.

The kill switch 102 and the access control unit 101 may connect to each other via a connector 128. The connector 128 may comprise a simple mechanical connection between the two components 101, 102. The connector 128 may also comprise a mechanical connection when the two components 101, 102 operate on a common electrical and signaling characteristics. In some embodiments of the invention, the connector 128 may include a bus that allows electronic communications to pass between the kill switch 102 and the access control unit 101.

Figure 1B:
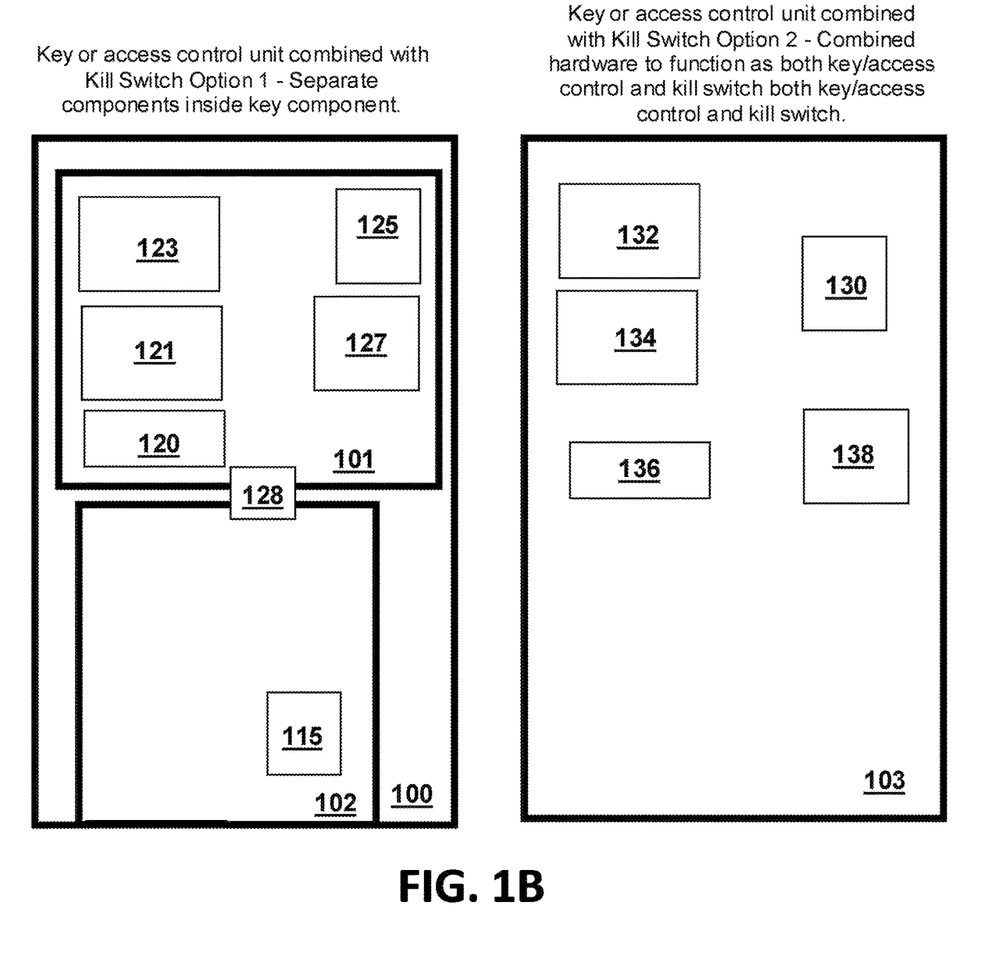
FIG. 1B illustrates another embodiment of the invention in which the key/kill switch control unit 100 and the key/kill switch control unit 103 comprise reduced hardware for carrying out kill switch functionality, according to an embodiment of the invention.

Another embodiment of the invention is illustrated by the key control unit 103 shown in FIG. 1B that includes unified kill/key components that comprises both electronic circuitry 142 (or other hardware) and a transceiver 130 that performs a wireless kill switch function combined with a key or access control circuitry or key processing electronics 132 or other hardware that performs access control functions. Having these two distinct functions combined into a single unit offers the advantages of simplicity and likely overall reduced cost since some components can be reduced or eliminated, e.g., batteries may be reduced from two to one, as well as the number of transceivers needed. This combination would be included in an unified body or case that housed both the access control unit and the kill switch system.

The key control unit 103 includes an RF transceiver 130 that transmits keying data (e.g., a key) to and receives data from a receiving unit via the receiving unit's RF transceiver to assist with access control functions. Communications between the transceiver 130 and the receiving unit's transceiver are typically encrypted, according to an embodiment of the invention. The encrypted transmissions may employ AES128 encryption or even higher standards of encryption, according an embodiment of the invention.

The key control unit 103 includes key processing electronics 132 configured to formulate a key (e.g., key data) for processing by the receiving unit and transceiver electronics 134 capable of controlling the RF transceiver 130 to transmit the key and related data to the receiving unit's RF transceiver. The transceiver electronics 134 includes the circuitry necessary for encrypting messages to be sent via the transceiver 130, according to an embodiment of the invention.

The key control unit 103 includes a key actuator 136, according to an embodiment of the invention. The key actuator 136 may comprise a button element whose physical actuation engages the key processing electronics 132. The key actuator 136 may also comprise a proximity sensor, a visual sensor, and/or a variety of automated engagement mechanisms, according to various embodiments of the invention. An embodiment including a proximity sensor may operate in conjunction with the transceiver 130.

The key control unit 103 also includes a battery 138 suitable for providing electrical power to the key processing electronic circuitry 132, the transceiver processing electronic circuitry 134, and the transceiver 130.

The kill switch electronics 142 may send a kill message (e.g., kill data) via a transceiver 130 to cause an alteration of another device (e.g., a signal to shut off the engine on a boat). In some embodiments, the discontinuation of regular transmissions from the transceiver 130 may effectively operate as an actuator that engages a kill switch mechanism on a paired receiving unit. In yet other embodiments, a delayed communication due to increased distance between the kill switch electronics 142 and a receiving unit will cause the receiving unit to engage a kill switch mechanism.

In some embodiments of the invention, the transceiver 130 communicates continuously with a paired transceiver on another device, e.g., one associated with the motor on a boat, such as the receiver 202 shown in FIG. 2. If the transceiver 130 stops communicating with the paired transceiver, then the loss of signal will engage the stopping of the associated device. For example, if the device 103 is associated with the pilot of a boat, and the pilot falls overboard, then the transceiver 130 is likely to be submerged in water and unlikely to communicate further with the paired transceiver on the receiving device. This disruption of communications with the device 103 will cause the receiver to engage a kill switch mechanism.

In some embodiments of the invention, the transceiver 130 may be paired with a receiving unit, such as the receiver 202 shown in FIG. 2. The paired receiving unit may continuously determine its distance from the transceiver 130. The distance may be determined by the speed of a radio transmission through a medium such as air, which approaches the speed of light at 3.3 nanoseconds/meter. Thus, the paired transceivers may be set for some acceptable distance (e.g., 2 meters), and if the time of the signal from the transceivers passes this range, then a kill switch mechanism on the paired receiving unit engages the kill switch signal to shut off some device, e.g., a marine boat engine.

The kill switch portion of the key control unit 103 may include a physical actuator 140 for engaging the kill switch electronics 142, according to an embodiment of the invention. The actuator 140 may comprise a physical connection to a device such as a lanyard that when broken or disconnected causes the actuator 140 to send a signal to the kill switch electronics 142. The kill switch electronics 140 may send a kill message via a transceiver 130 to cause an alteration of another device (e.g., a signal to shut off the engine on a boat). The kill switch portion of the key control unit 103 may also be powered by the battery 138.

The components of the key control unit 103 may be connected together so as to allow electronic communications to pass between the various components (e.g., the key processing electronic circuitry 132 may communicate with the kill switch electronics 142).

In some embodiments of the invention, the key control unit 103 may comprise a mobile phone having application software that performs the tasks handled by the key processing electronics 132 and the kill switch electronics 142 and uses the mobile phone's organic transceiver for communications. The key actuator 136 could comprise a soft button on the mobile phone or possibly a physical actuator that plugs into a port on the mobile phone. The kill switch actuator 140 may comprise a plug-in device to the mobile phone or may comprise an operation involving the mobile phone's transceiver and a remote sensor, according to an embodiment of the invention.

As previously described, the kill switch 103 may turn off an engine under certain conditions. However, in some embodiments of the invention, activation of the kill switch may instead cause the engine to reduce its throttle. This action may be accompanied by other actions, such as notifying one or more persons onboard the vessel (or even remote persons) that someone has fallen overboard, according to an embodiment of the invention.

Another action that may be taken when someone has fallen overboard is engagement of a sensor that will mark the GPS location of the vessel (or vehicle) when the overboard event occurred. This data may be transferred wirelessly to data points away from the vessel (vehicles), such as to other boats and/or the coast guard and/or other vehicles, according to an embodiment of the invention.

In both the key control units 100, 103, the key control units may include a bus, such as a Controller Area Network (CAN bus), that allows the data from key control units. 100, 103 to be displayed on other devices, according to an embodiment of the invention. In addition, sensors associated with the devices may be named, and status information, such as the number of device fobs and battery life, may be transmitted along the CAN bus. In addition, commands received from other devices may also be transmitted along the CAN bus, according to an embodiment of the invention.

FIG. 1B illustrates another embodiment of the invention in which the key/kill switch control unit 100 and the key/kill switch control unit 103 comprise reduced hardware for carrying out kill switch functionality, according to an embodiment of the invention.

In this embodiment, the kill switch 102 of the key control unit 100 may comprise simply a transceiver (e.g., the transceiver 115) and little to no other functionality. Similarly, the kill switch functionality in the key control unit 103 may comprise little more than the transceiver 130.

In such an embodiment of the invention, the transceiver 115 may be paired with a transceiver on a receiving unit, such as the receiver 202 shown in FIG. 2. The paired transceiver on the receiving unit may continuously determine its distance from the transceiver 115. The distance may be determined by the speed of a radio transmission through a medium such as air, which approaches the speed of light at approximately 3.3 nanoseconds/meter. Thus, the paired transceivers may be set for some acceptable distance (e.g., 2 meters), and if the time of the signal from the transceivers passes this range, then a kill switch mechanism on the receiving unit itself engages a kill switch signal to alter a state of some device, e.g., an operational state of a marine boat engine.

Similarly, the transceiver 130 may be paired with a transceiver on a receiving unit, such as the receiver 202 shown in FIG. 2. The paired transceiver on the receiving unit may continuously determine its distance from the transceiver 130. The distance may be determined by the speed of a radio transmission through a medium such as air, which approaches the speed of light at approximately 3.3 nanoseconds/meter. Thus, the paired transceivers may be set for some acceptable distance (e.g., 2 meters), and if the time of the signal from the transceivers passes this range, then a kill switch mechanism on the receiving unit itself engages a kill switch signal to alter a state of some device, e.g., an operational state of a marine boat engine.

FIG. 2 illustrates an embodiment of the invention in which a key unit 201 communicates with a receiving device 202. The receiving device may be located on a vehicle (or vessel), according to an embodiment of the invention.

The receiving device 202 may comprise a transceiver 204 capable of communicating with a transceiver 203 on the key unit 201. The receiving device 202 includes a key unit that can unlock a locked component and a kill switch that can alter (e.g., disengage) the motor on a vehicle associated with the receiving device.

The receiving device 202 may further comprise any sort of device that has additional components (e.g., a locked component) that may be acted upon (e.g., unlocked) by commands received from the key unit 201. These additional components, when engaged, perform functions such as opening or closing a lock, turning on the ignition of a motor, turning off a motor, actuating nearly any type of switch, and starting/stopping nearly any type of machinery, according to an embodiment of the invention.

The key unit 201 comprises a transceiver 203, a hardware unit 206 that contains hardware which functions as a key or access control unit, such as the key processing electronics 123 shown in FIG. 1A, and also includes a kill switch, such as the kill switch 102 shown in FIG. 1A, and an actuation means 205 for engaging the hardware unit 206. The actuation means may include devices as diverse as buttons and motion sensors, according to an embodiment of the invention.

The hardware unit 206 may comprise either type of key control unit 100, 103 shown in FIG. 1A.

The receiving device 202 may comprise additional circuitry for altering the state change last requested by the key unit 201 under certain conditions, according to an embodiment of the invention.

For example, if the key unit 201, acting as a kill switch, has sent a signal to the receiving device 202 to switch off an engine on a motorboat, then the receiving device 202 may allow the engine to be re-engaged after some period of time, according to an embodiment of the invention. The period of time before re-engagement may equal the time period specified in relevant safety regulations where such regulations exist. For example, some marine regulations require that kill switches only prevent engines for turning on during a 6-second period after the kill switch has been activated. Otherwise, in the absence of regulations, the time period may be preset to a specified number or the time period may be configurable by the user, according to an embodiment of the invention.

Depending upon the overall function of the system, the receiving device 202 may include similar circuitry to override or modify a valid instruction received from the key unit 201, according to an embodiment of the invention. As mentioned above, the receiving device. 202 may include a keying mechanism or unit configured to actually unlock a locked component upon receipt of the key. The receiving device 202 may also include a kill switch that can cause a motor associated with the vehicle to alter a state of the motor, where alteration of the motor includes stopping the motor and/or throttling the motor back.

The key unit 201 and the receiving unit 202 may communicate with each other via an encrypted communications protocol, according to an embodiment of the invention. The encryption level in the communications protocol may be preset or it may be configurable by the user, according to an embodiment of the invention. The encrypted transmissions may employ AES128 encryption or even higher standards of encryption, according an embodiment of the invention.

Figure 3:
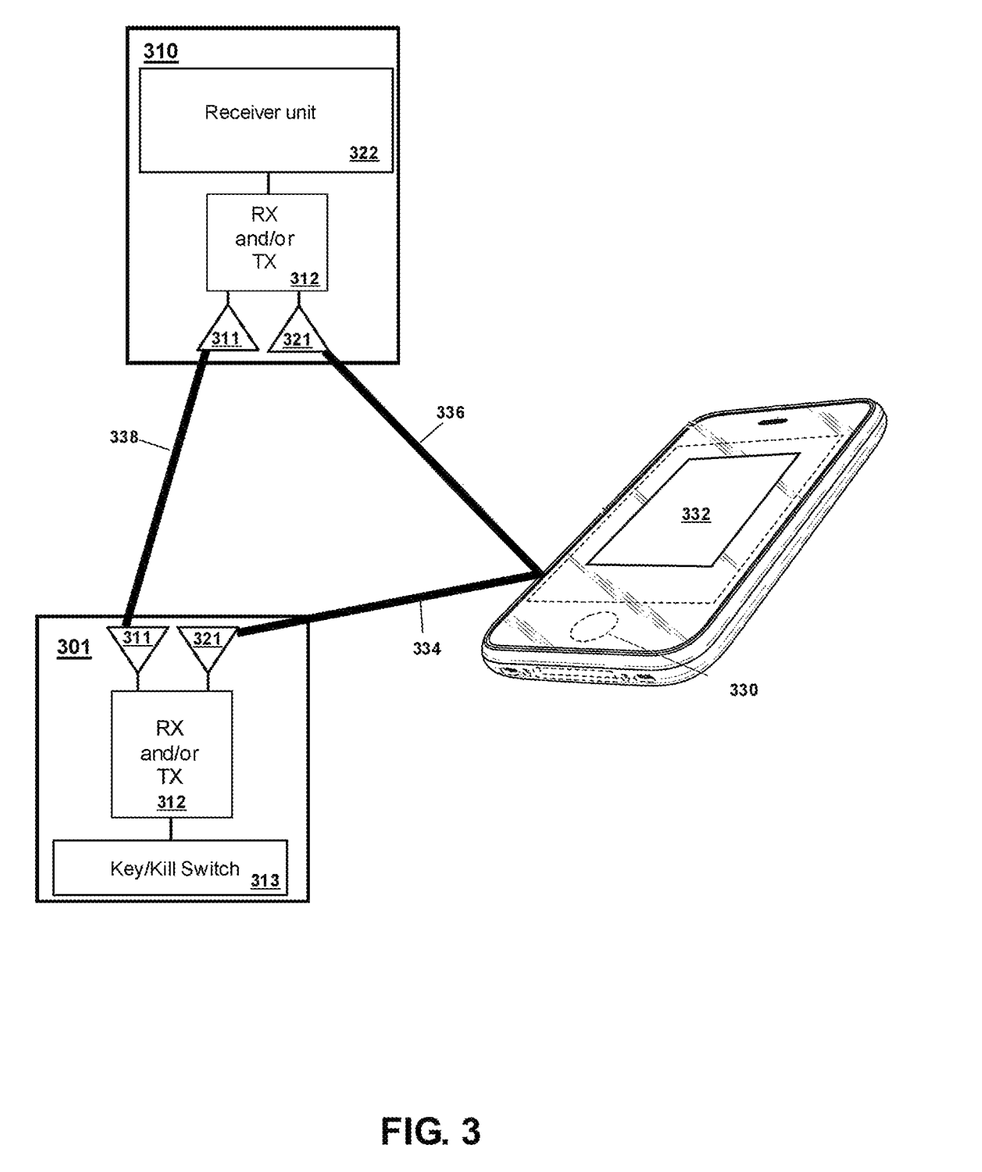
FIG. 3 illustrates a pairing procedure for a key/kill switch 313 in a key/kill switch device 301 paired with a receiver 310 with the pairing process directed by a mobile phone 330, according to an embodiment of the invention.

FIG. 3 illustrates a pairing procedure for a key/kill switch 313 in a key/kill switch device 301 paired with a receiver 310 with the pairing process directed by a mobile phone 330, according to an embodiment of the invention. The key/kill switch device 301 could comprise a key/kill switch combination device, such as the key control units 100, 103 shown in FIG. 1A, according to an embodiment of the invention. The paired devices could be used to transmit keys as well as kill switch data, according to embodiments of the invention.

The pairing procedure involves the use of Bluetooth communications via the mobile phone 330 with post-pairing communications between the key/kill switch device 301 and the receiver 310 conducted using sub-1 GHz communications, according to an embodiment of the invention. This device pairing method simplifies the pairing process while still allowing the paired devices to communicate in the more robust sub-1 GHz range. Using this method, it should not matter if the key/kill switch device 301 and the receiver 310 are out of Bluetooth range for communications with each other during the pairing procedure, so long as they are still in communications range with the mobile phone 330, according to an embodiment of the invention.

The mobile phone 330 includes an application 332 configured to direct the pairing of key/kill switch devices, such as the device 301 and a receiver, such as the receiver 310, according to an embodiment of the invention. The application 332 directs a Bluetooth communication to either the key/kill switch device 301 or the receiver 310. The key/kill switch device 301 and the receiver 310 contain Bluetooth transmitters 321. The application 332 may start with either the key/kill switch device 301 or the receiver 310. Other communications protocols apart from Bluetooth may be employed in embodiments of the invention.

The application 332 collects the information that another device would need to have in order to communicate with the device being interrogated. Thus, if the application 332 started first with the key/kill switch device 301 using a communication 334, then the application 332 would collect the information needed by another device to communicate with the key/kill switch device 301. The application 332 then interrogates another device. If the next device interrogated is a receiver device, such as the receiver 310 via communication 336, then the application 332 provides the receiver with the communication information for the key/kill switch device 301.

Now that the receiver 310 has been paired with the key/kill switch device 301, then the receiver 310 and the key/kill switch device may communicate information 338 via their transceivers 311 using sub-1 GHz communications, according to an embodiment of the invention.

In embodiments of the invention where the key/kill switch device 301 contains only a transmitter and not a transceiver or receiver capable of communication using sub-1 GHz communications, then the pairing process may begin with the application 332 obtaining the needed communication information from the key/kill switch device 301 and providing this information to the receiver 310. Since the key/kill switch device 301 does not contain a receiver, then the sensor device 301 cannot send a pairing acknowledgement to the receiver 310.

In an alternative embodiment, where the key/kill switch device 301 contains only a transmitter and not a transceiver or a receiver capable of communicating using sub-1 GHz communications, then the pairing process may begin with the application 332 obtaining needed communication information from the receiver 310 using the Bluetooth transceiver 321, and then transmitting this information to the key/kill switch device 301 using the Bluetooth transceiver 321 on the key/kill switch device 301. The key/kill switch device 301 may send a pairing acknowledgement using its sub-1 GHz transmitter 311 to the sub-1 GHz receiver (or transceiver) on the receiver 310, according to an embodiment of the invention. The transceiver 321 need not necessarily be a Bluetooth transceiver and could instead operate according to another communications protocol, according to an embodiment of the invention.

In embodiments of the invention, where both the key/kill switch device 301 and the receiver 310 contain sub-1 GHz transceivers, then the application 332 may begin with either device, according to an embodiment of the invention.

Other Bluetooth-enabled devices apart from a mobile phone may direct the pairing process, according to an embodiment of the invention.

Embodiments of this pairing process may enable a customer to obtain a new key for a device (e.g., an automobile) inexpensively and pair it themselves, especially in comparison with conventional solutions where customers have to go through a retailer and pay an excessive amount for a new key.

The application 332 may also include functionality that allows for setting ranges of operation for the device 301 and the device 310. The application 332 may also allow for adjustment of various settings, such as settings relating to the amount of throttle reduction, as well as setting names for all the various components available in the network, according to an embodiment of the invention.

Figure 4:
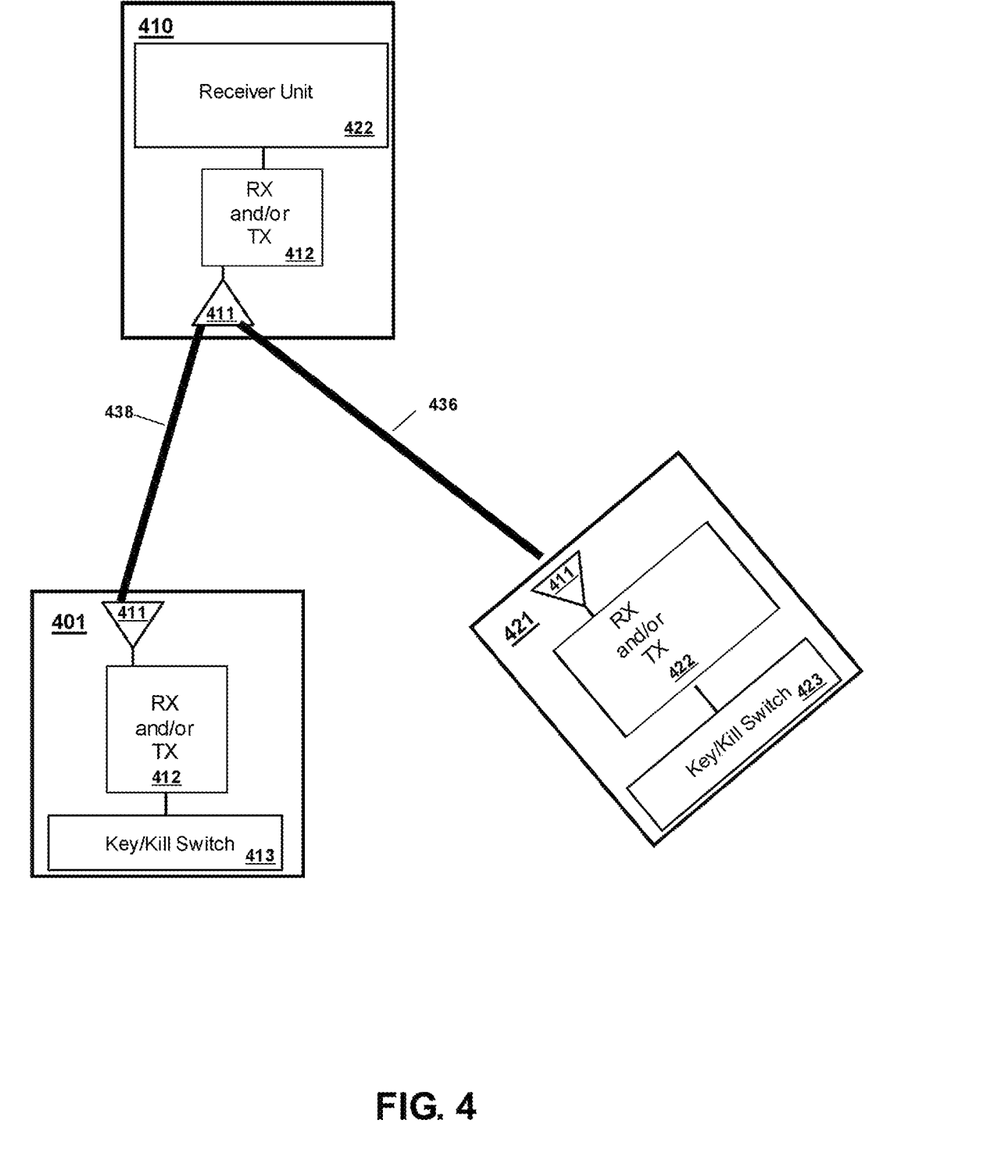
FIG. 4 illustrates an automatic role updating procedure for a key/kill switch 413 in a key/kill switch device 401 paired with an receiver 410 that is also in communication with a key/kill switch 423, according to an embodiment of the invention.

FIG. 4 illustrates an automatic role updating procedure for a key/kill switch 413 in a key/kill, switch device 401 paired with a receiver 410 that is also in communication with a key/kill switch 423, according to an embodiment of the invention.

Assume, for example, that the key/kill switch 423 is presently associated with the pilot of a boat, and assume that the key/kill switch 413 is presently associated with a passenger on the boat. The key/kill switch 413 is not presently operating in a key or kill switch mode because the pilot is still operating the boat. If the pilot falls overboard and engages the kill switch, this event is reported to the receiver 410 via communication 436. Engagement of the kill switch via the receiver 410 is typically required in embodiments of the invention.

Once the receiver 410 is aware that the pilot has fallen overboard, then the receiver 410 may not only reduce engine speed (or cut engine speed entirely), the receiver 410 may also include a promotion unit that acts to promote the key/kill switch 413 to a pilot role via communication 438. Thus, the passenger associated with the key/kill switch 413 now becomes the pilot of the boat. Among other things, the former passenger's key/kill switch now becomes the active key/kill switch from the point of view of the receiver 410, according to an embodiment of the invention. The receiver 410 may also engage other actions when a passenger is promoted to pilot. The promotion unit may comprise a relatively simple set of electronics and/or software the performs the promotion described above.

Of course, promotion of a passenger to pilot may be a configurable data item, as some passengers (e.g., children) may not be suitable for serving as the pilot of a vessel.

The key/kill switch device 401 could comprise a key/kill switch combination device, such as the key control units 100, 103 shown in FIG. 1A, according to an embodiment of the invention. The paired devices could be used to transmit keys as well as kill switch instructions, according to embodiments of the invention.

The configuration of devices shown in FIG. 4 may include more than just two key/kill switch devices. In addition, the network may allow the connection of multiple other fobs which can perform other functions, such as an alarm function, according to an embodiment of the invention.

Various embodiments of the invention have been described in detail with reference to the accompanying drawings. References made to particular examples and implementations are for illustrative purposes, and are not intended to limit the scope of the invention or the claims.

It should be apparent to those skilled in the art that many more modifications of the invention besides those already described are possible without departing from the inventive concepts herein. The inventive subject matter, therefore, is not to be restricted except by the scope of the appended claims. Moreover, in interpreting both the specification and the claims, all terms should be interpreted in the broadest possible manner consistent with the context.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols (e.g., Wi-Fi) and/or may be configured to operate according to specialized protocols. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

It should be noted that while many embodiments of the invention described herein are drawn to a smart wireless invention, various configurations are deemed suitable and may employ various computing devices including servers, interfaces, systems, databases, agents, engines, controllers, or other types of computing devices operating individually or collectively. One should appreciate that any referenced computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed smart invention.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms "coupled to" and "coupled with" are also used euphemistically to mean "communicatively coupled with" where two or more networked devices are able to send or receive data over a network.

We claim:

1. A wireless keying and kill switch system, comprising:
   a kill switch unit configured to wirelessly communicate with a kill switch on a vehicle, the kill switch unit, comprising:
      kill switch electronics configured to send a kill message to alter a state of a motor on the vehicle; and
   an access control unit configured to wirelessly communicate a key to the vehicle, the access control unit comprising:
      key processing electronics configured to formulate the key for processing by the vehicle to unlock a locked component on the vehicle;
      a key actuator that engages the key processing electronics; and
   at least one transceiver configured to transmit encrypted communications from at least one of the kill switch unit and the key control unit to the vehicle; and
   a receiving device on the vehicle configured to receive the key from the key processing electronics and configured to receive the kill message, the receiving device comprising:
      a key unit that receives the key and unlocks the locked component associated with the vehicle; and
      a kill switch configured to alter the state of the motor on the vehicle upon receipt of the kill message, wherein alteration triggered by the kill switch causes a device to mark the GPS location of the vehicle.

2. The wireless, keying and kill switch system of claim 1 wherein alteration triggered by the kill switch causes the vehicle to stop the motor.

3. The wireless, keying and kill switch system of claim 1 wherein alteration triggered by the kill switch causes the vehicle to reduce the speed of the motor.

4. The wireless keying and kill switch system of claim 1 wherein the device is a chart plotter.

5. The wireless keying and kill switch system of claim 1 further comprising:
   at least one battery configured to power at least one of the access control unit and the kill switch unit.

6. The wireless keying and kill switch system of claim 1 further comprising:
   a connector that attaches the kill switch unit to the access control unit.

7. The wireless keying and kill switch system of claim 6 wherein the connector includes a bus that transmits data between the kill switch electronics and the key processing electronics.

8. The wireless keying and kill switch system of claim 1, further comprising a case that contains the access control unit and the kill switch system.

9. The wireless keying and kill switch system of claim 1 wherein the access control unit and the kill switch unit are located inside a mobile phone.

10. The wireless keying and kill switch system of claim 1 wherein the vehicle is one of a boat, a marine vessel, an automobile, and a motorized vehicle.

11. A wireless keying and kill switch system, comprising:
    a kill switch unit configured to wirelessly communicate with a kill switch on a vehicle, the kill switch unit, comprising:
       kill switch, electronics configured to send a kill message to alter a state of a motor on the vehicle; and
    an access control unit configured to wirelessly communicate a key to the vehicle, the access control unit comprising:
       key processing electronics configured to formulate the key for processing by the vehicle to unlock a locked component on the vehicle; and
       a key actuator that engages the key processing electronics; and
    at least one transceiver configured to transmit encrypted communications from at least one of the kill switch unit and the key control unit to the vehicle; and a receiving device on the vehicle configured to receive the key from the key processing electronics and configured to receive the kill message, the receiving device comprising:
    a key unit that receives the key and unlocks the locked component associated with the vehicle;
    a kill switch configured to alter the state of the motor on the vehicle upon receipt of the kill message; and
    a promotion unit configured to promote another kill switch unit to an active mode when the kill switch receives the kill message.

12. The wireless keying and kill switch system of claim 11 wherein the kill switch unit and the access control unit operate as a first device, the system further comprising:
    a mobile device configured to pair the first device to the receiving device for receipt of the key and the kill message.

13. The wireless keying and kill switch system of claim 11, further comprising at least another transceiver configured to transmit encrypted communications from at least one of the kill switch unit and the key control unit to the vehicle.

14. The wireless keying and kill switch system of claim 11 wherein the vehicle is one of a boat, a marine vessel, an automobile, and a motorized vehicle.

15. A wireless keying and kill switch system, comprising:
  a kill switch unit configured to wirelessly communicate with a kill switch on a vehicle, the kill switch unit, comprising:
    kill switch electronics configured to send a kill message to alter a state of a motor on the vehicle; and
    an actuator for engaging the kill switch electronics, wherein the actuator for engaging the kill switch electronics comprises a lanyard removably attached to the kill switch unit, wherein disconnection of the lanyard from the kill switch unit engages the kill switch electronics; and
  an access control unit configured to wirelessly communicate a key to the vehicle, the access control unit comprising:
    key processing electronics configured to formulate the key for processing by the vehicle to unlock a locked component on the vehicle; and
    a key actuator that engages the key processing electronics; and
  at least one transceiver configured to transmit encrypted communications from at least one of the kill switch unit and the key control unit to the vehicle.

16. The wireless keying and kill switch system of claim 15 wherein the at least one transceiver transmits encrypted communications at AES128 encryption.

17. The wireless keying and kill switch system of claim 11 wherein the key actuator comprises at least one of a button, a proximity sensor, a visual sensor, and an automated engagement mechanism.

18. The wireless keying, and kill switch system of claim 17 wherein the proximity sensor comprises circuitry configured to analyze signal strength between a transceiver on a receiving device and at least one transceiver.

19. The wireless keying and kill switch system of claim 15 wherein the vehicle is one of one of a boat, a marine vessel, an automobile, and a motorized vehicle.

* * * * *